Oct. 9, 1951 R. A. SPENGLER 2,570,727
PUMP GOVERNOR
Filed Aug. 19, 1948 2 Sheets-Sheet 2

INVENTOR.
RALPH A. SPENGLER
BY Hudson, Boughton,
Williams, David & Hoffmann
ATTORNEYS Patented Oct. 9, 1951

2,570,727

UNITED STATES PATENT OFFICE 2,570,727

PUMP GOVERNOR

Ralph A. Spengler, Cleveland, Ohio

Application August 19, 1948, Serial No. 45,115

19 Claims. (Cl. 103—16)

This invention relates to a pump governor and, more particularly, to a means for controlling the speed of a prime mover driving a fluid pump to thereby maintain the pressure of the fluid delivered by the pump at a substantially constant, preselected value.

An object of the invention is the provision of an improved apparatus for controlling the operation of a fluid pump, by controlling the speed of the prime mover driving the pump in accordance with the output pressure of the pump and a condition which is indicative of the speed of the prime mover, so that the latter is prevented from racing while the pressure of the fluid delivered by the pump is being raised to a predetermined value and the said pressure is thereafter maintained substantially constant.

Another object of the invention is the provision of an improved apparatus for controlling the operation of a fluid pump by controlling the flow of operating fluid to a fluid-operated engine driving the pump in accordance with the pressure of the exhaust of the engine and the output pressure of said pump.

A further object of the invention is the provision of an improved apparatus of the type defined in the preceding object in which the control of the operating fluid is effected by valve means in the fluid supply conduit for the engine, the said valve means being controlled by pressure responsive devices associated with the exhaust of the engine and with the output of the pump, and the pressure responsive device associated with the pump being adjustable to effect operation of the valve means at different preselected pressures of the pump output.

An additional object of the invention is the provision of an improved pump governor of the type mentioned in the two preceding objects and in which a by-pass is provided around the said valve means with manually operable means to control the flow of engine-operating fluid through the by-pass, whereby the quantity of operating fluid delivered to the engine cannot drop below a predetermined value regardless of the operation of the valve means.

Still another object of the invention is the provision of an improved apparatus for governing the output of a fluid pump driven by an engine operated by fluid, which comprises a pressure responsive device operatively associated with the exhaust of the engine, a manually settable pressure responsive device operatively associated with the output of the pump, and a single valve means disposed in the fluid supply conduit for the said engine and jointly controlled by both of said pressure responsive devices.

The invention also has as its object the provision of a new and improved combination of a prime mover and fluid pump driven thereby in which the speed of the prime mover is jointly controlled by the pressure of the fluid delivered by the pump and by a condition which is indicative of the speed of the prime mover so that the latter is prevented from racing while the pressure delivered by the pump is being raised to a predetermined value and the said pressure is thereafter maintained substantially constant.

The invention further resides in certain novel features of construction and combination and arrangements of parts, and further objects and advantages thereof will be apparent to those skilled in the art to which it pertains from the following description of the present preferred embodiment, and certain modifications thereof, described with reference to the accompanying drawings in which similar reference characters represent corresponding parts in the several views and in which.

In installations employing fluid, such as water, air, or the like, under pressure, it is customary to employ a pump for pressuring the fluid. In such installations, it is generally desirable that the pressure of the fluid delivered by the pump be maintained substantially constant without the necessity of providing surge tanks or reservoirs between the output of the pump and the point of utilization of the fluid. However, when the pump is initially placed in operation, it offers a relatively small load to the prime mover driving it so that the latter tends to race, which is objectionable because of the likelihood of damage to the engine and/or the pump, and also because this racing is wasteful of the power employed to operate the prime mover. These and related problems are solved in accordance with this invention by controlling the speed of the prime mover jointly by the pressure of the pump output and by a condition which is responsive to the speed of the prime mover.

Figure 1:
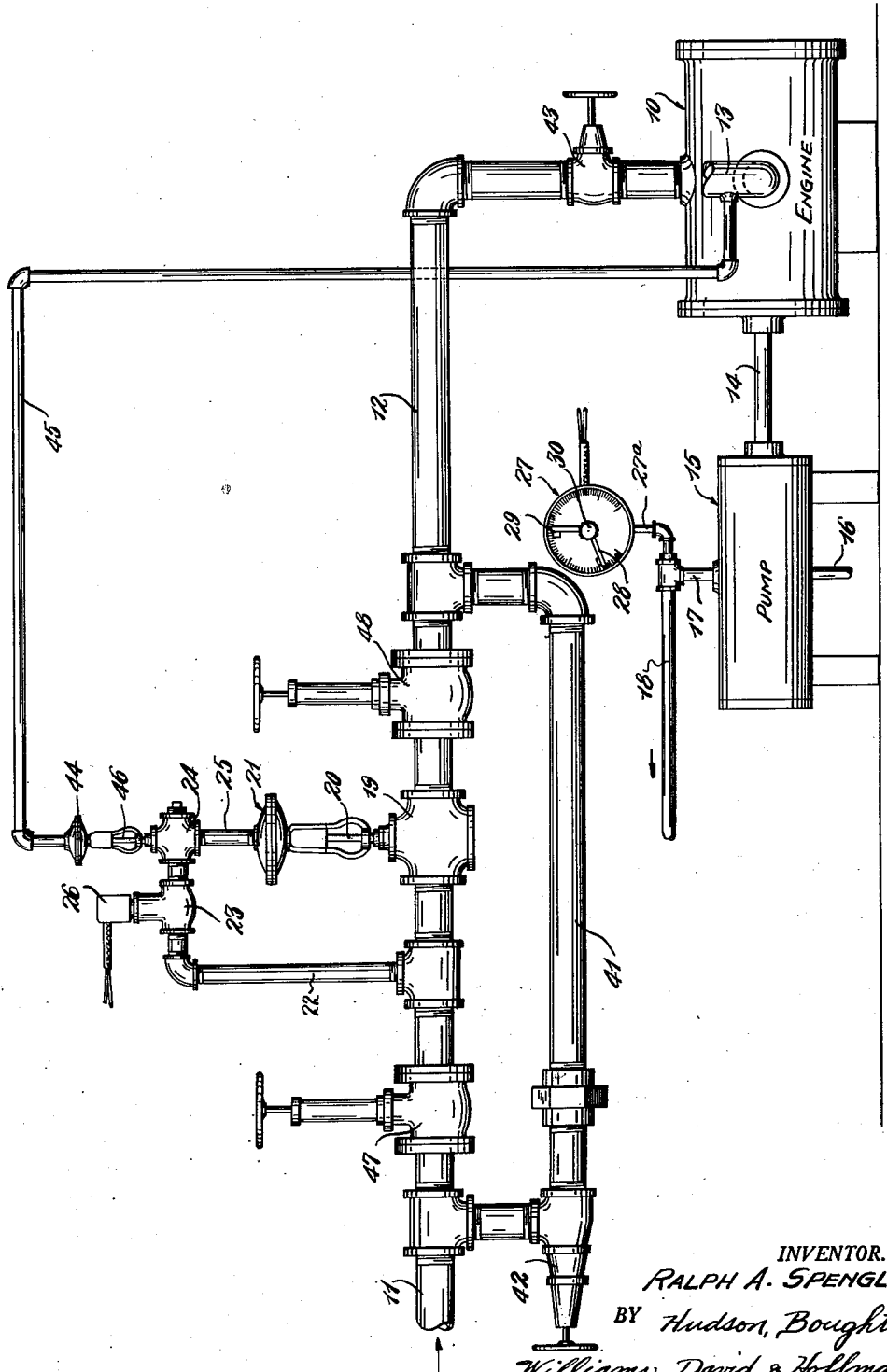
Fig. 1 is a front elevational view of the present preferred form of the invention.

Fig. 1 of the drawings illustrates the present preferred form of an apparatus constructed in accordance with the invention. As shown therein, a prime mover 10, illustrated as a reciprocating steam engine, is supplied with steam through the inlet conduit 11, 12 exhaust of the engine being effected through a conduit 13. The piston rod 14 of the engine is operatively connected with the piston of a reciprocating fluid pump, generally designated 15, to operate the latter, the pump being provided with an inlet 16 and an outlet 17 for the fluid which is to be delivered to the conduit 18 at a predetermined pressure.

Interposed between the portions 11 and 12 of the steam supply conduit for the engine, is a flow controlling valve 19, the operation of which is automatically governed by the pressure of the fluid delivered by the pump 15 and the pressure of the exhaust of the engine 10. For this purpose, the valve 19 has its stem or actuating member 20 operatively connected with a fluid motor, generally designated 21, which is preferably of the conventional diaphragm type, the details of which need not be here described. Fluid pressure for operating the motor 21 is supplied from the main supply conduit 11, 12 through an intercommunicating branch conduit 22, valves 23 and 24, and a conduit 25. The construction is such that the valves 23 and 24 are open except when operated, as hereinafter described, so that operating fluid is delivered to the fluid motor 21 with the result that the valve 19 is fully open allowing free passage of steam to the engine 10.

The valve 23 is preferably electromagnetically operated, and hence its valve stem is connected with the armature of an electromagnet, generally designated 26. The energization of this electromagnet is controlled by a pressure responsive device 27 associated with, and responsive to, the pressure of the output of pump 15. As shown in Fig. 1, the pressure responsive device 27 comprises a Bourdon type pressure gauge, the movable hand or pointer 28 of which is connected in the well-known manner to be movable in response to the fluid pressure applied to the gauge through the connections 27a thereof with the pump output. The gauge 27 is further provided with a second hand or pointer 29 which is manually settable by a knob 30 so that the hand or pointer 29 may be positioned in alignment with one of the pressure indicia on the gauge corresponding with the desired pressure of the fluid to be delivered by the pump. The hands or pointers 28, 29 are insulated from each other and are provided with cooperating contacts, thus forming a switch in an electrical circuit for controlling the energization of the electromagnet 26.

Figure 3:
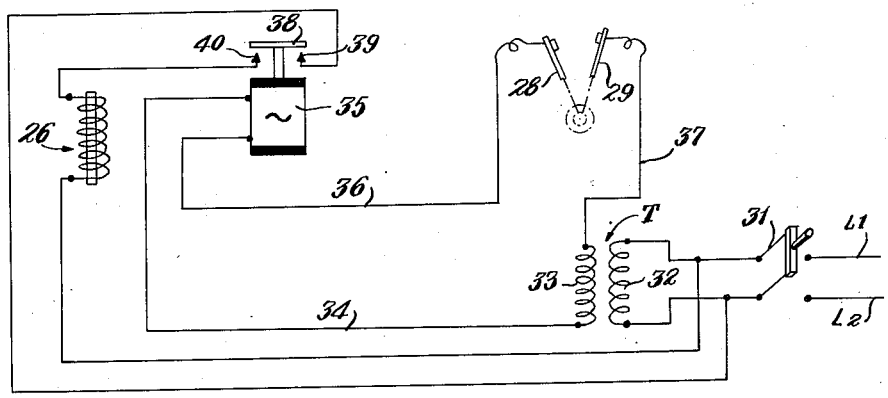

One form of an electrical circuit for interconnecting the pressure responsive device 27 to effect control of the electromagnet 26 is illustrated in Fig. 3. As shown therein, electric power, which may conveniently be of the 60-cycle, 110–120 volt A. C. type, is supplied through power lines L1 and L2, and a suitable switch 31 to the primary 32 of a transformer, generally designated T. The secondary 33 of this transformer has one lead 34 thereof connected to one terminal of the coil of an alternating current relay 35, the other terminal of the relay coil being connected by a wire 36 to the hand or pointer 28 of the gauge 27. The manually settable hand or pointer 29 of the gauge is connected by a wire 37 to the other terminal of the transformer secondary 33. The relay 35 is provided with a movable contact 38 adapted to bridge stationary contacts 39, 40 when the relay 35 is energized, thereby closing a series circuit through the electromagnet 26 to the power supply lines, the connections with the latter being intermediate switch 31 and the transformer T.

The construction just described is such that, when the hand or pointer 29 is set to a predetermined pressure and the engine 10 is in operation, the pressure of the fluid delivered by the pump progressively builds up, thereby moving the hand 28 towards the pointer or hand 29 until the contacts on the pointers or hands engage. Engagement of the hands or pointers 28, 29 closes the circuit therethrough energizing the relay 35 which, in turn, energizes the electromagnet 26 so that the latter operates the valve 23 to closed position. This terminates the supply of fluid pressure to the fluid motor 21 with the result that the valve 19 is closed by the action of a spring or the like not shown. Consequently, the main supply of steam to the engine 10 is interrupted so that the engine 10 either stops or is operated at a greatly reduced speed, as hereinafter described. In either event, the pressure of the fluid delivered by the pump 15 is decreased, since the pump likewise either stops or operates at greatly reduced speed. As the pressure in the outlet conduit 18 drops, the hand 28 moves from engagement with the hand 29 deenergizing relay 35 and, consequently, the electromagnet 26, with the result that the valve 23 is again opened and fluid pressure is supplied to the fluid motor 21, again opening the valve 19. Hence, steam is once more supplied through the main conduit to the engine 10 and the latter resumes full speed operation, driving the pump at a rate such that the pressure of the fluid delivered thereby is again sufficient to move the hand 28 of the gauge into engagement with the hand 29. This procedure is continuously repeated so that the pressure delivered by the pump remains at substantially the value corresponding to the set or preselected position of the pointer 29.

Preferably, the supply of steam to the engine 10 is not completely terminated by the operation of the valve 19 so that the engine and pump remain in continuous operation, although at reduced speed, when the valve 19 is closed. This is effected by means of a by-pass conduit 41 connected around the valve 19, a needle valve or other suitable regulating valve 42 being interposed in the by-pass conduit 41 so that a preselected quantity of steam is at all times supplied to the engine 10 when the valve 43 in the conduit 12 is open. The needle valve 42 may be adjusted to provide for the passage of sufficient steam so that the speed of the engine, and hence of the pump, is such as to provide for pressure losses in the system, of which the pump forms a part. Hence, the pressure in the system is maintained substantially constant when the fluid thereof is not being used, and the pressure responsive device 27 operates the valve 19 to control the speed of the engine and thereby maintain the pump output pressure at the desired value when the fluid delivered by the pump is being utilized.

In the construction thus far described, the prime mover of the apparatus, when initially placed in operation, would tend to race because the pump does not offer a sufficient load until the pressure of the fluid delivered thereby has increased an appreciable amount. This racing of the engine, and hence of the pump, is highly objectionable because it is inefficient and, in addition, might result in damage to either the pump or the engine, or both. In accordance with this invention, such racing of the prime mover is avoided by operating the valve 24 in accordance with a condition which is indicative of the speed of the prime mover. In the embodiment illustrated in Fig. 1, this is effected by communicating the exhaust pressure of the engine 10 to a fluid motor 44 through a conduit 45 connected with the exhaust 13 of the engine. The fluid motor 44 is connected with the valve stem 46 of the valve 24.

As mentioned before, when the apparatus is first placed in operation, the valves 23 and 24 are open so that the valve 19 is likewise open, and hence the engine 10 is supplied with a full head of steam. As the engine accelerates and tends to race, the pressure of the exhaust becomes greater than normal and a portion of this pressure is transmitted through the conduit 45 to the fluid motor 44 operating the valve 24 to close, or partially close, the latter. This, in turn, terminates, or partially terminates the supply of fluid pressure to the fluid motor 21 so that the valve 19 is likewise closed, or partially closed, and hence the supply of steam through the valve 19 is terminated, or partially terminated. This results in a decrease in the speed of the engine 10, and hence the exhaust pressure of the latter drops so that valve 24 is again fully opened, thereby fully opening the valve 19. This procedure is continuously repeated until the pressure of the fluid delivered by the pump 15 has reached the predetermined value, at which time the hand or pointer 28 engages the hand or pointer 29, thereby causing closing of the valve 23 and resulting closing of the valve 19, as previously described.

It is apparent, therefore, that the pressure of the fluid delivered by the pump 15 is rapidly brought up to the predetermined value without racing of the prime mover or engine 10 and is thereafter maintained substantially constant by operation of the pressure responsive device 27.

The preferred form of the apparatus also preferably includes one or more manually operated valves by which the entire flow of steam for the engine 10 may be diverted through the bypass 41, thus enabling the engine and hence the pump, to be manually controlled by the valve 42 in the event of electrical power failure or other unforeseen contingencies in the operation of the automatic control. For this purpose, there is shown in Fig. 1 a pair of manually operated valves 47 and 48, the valve 47 being interposed in the main conduit between the connections of the branch conduit 22 and the by-pass conduit 41, and the valve 48 being interposed in the main conduit between the valve 19 and the connection of the by-pass conduit 41. By closing both the valves 47 and 48, the automatic control mechanism may be removed for repair and/or replacement during which time the engine and pump may be operated through the by-pass 41 under manual control of the valve 42.

Figure 2:
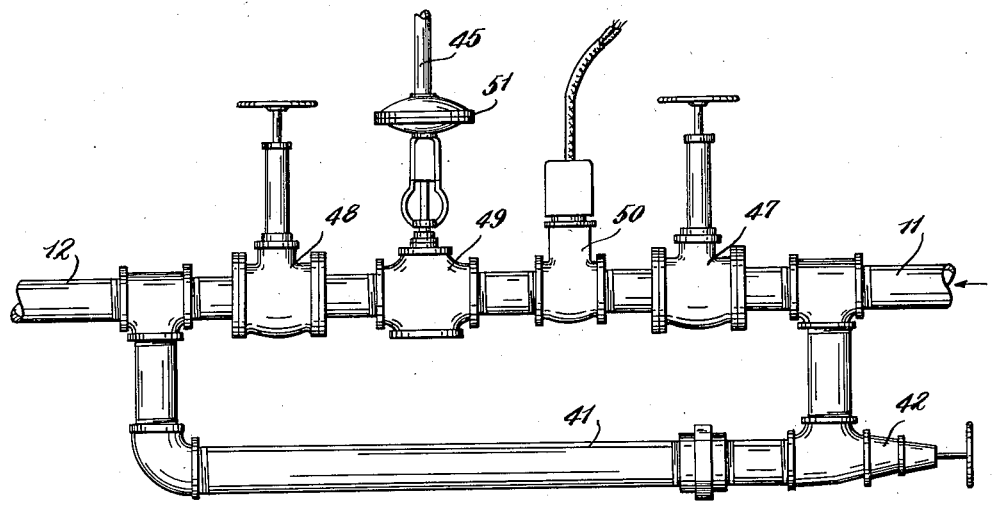
Fig. 2 is a detached front elevational view of a modified form of the means for controlling the flow of operating fluid to an engine which drives the pump; and, Fig. 3 is a schematic wiring diagram of an electrical circuit which may be employed with either of the illustrated embodiments of the invention.

Instead of employing the pressure responsive devices which are associated with the pump output and the engine exhaust to control pilot valves such as 23 and 24 and thereby jointly control the single main valve 19, the invention may also be embodied as shown in Fig. 2. As will be seen therein, the main supply conduit 11, 12 for the engine 10 is, as before, provided with a by-pass 41 and needle valve 42 with the control mechanism connected in the main conduit between the connections of the by-pass. Also, as in the embodiment shown in Fig. 1, manually operable valves 47 and 48 are provided in the main conduit, intermediate the connections of the by-pass, so that the entire supply of operating fluid to the prime mover may be diverted through the by-pass 41. In the instant embodiment, however, the automatic control takes the form of two separate valves 49 and 50 interposed in series in the conduit 11, 12 between the valves 47 and 48. The valve 50 is electromagnetically operated and is identical in construction with that designated 23 in Fig. 1, except that it is of larger size, the electromagnet of the valve being connected in the circuit as shown in Fig. 3 so that it is controlled by the pressure responsive device 27 in the same manner as previously described for the valve 23. The valve 49 is operated by a fluid motor 51 connected to the conduit 45, which leads to the exhaust of the prime mover 10. Hence, the valve 49 and its operator 51 are identical with the valve 24 and operator 44, except that the former are larger than the latter and the valve 49 is directly interposed in the main supply conduit for the prime mover or engine 10.

In employing the apparatus illustrated in Fig. 2, the control effected thereby is the same as previously described. When the apparatus is initially placed in operation, both valves 49 and 50 are fully open so that the engine 10 is supplied with a full head of steam. As the speed of the engine increases above the desired value, the increased pressure of its exhaust is communicated through the pipe 45 to operate the valve 49 to closed, or partially closed position, and thereby terminate, or partially terminate, the supply of steam to the engine 10. When the exhaust pressure of the engine 10 has dropped sufficiently, the valve 49 is again opened by a spring, not shown, and this continues until the pump is delivering fluid at substantially the desired pressure. Likewise, as in the embodiment shown in Fig. 1, when the pressure of the fluid delivered by the pump has reached the predetermined value corresponding with the setting of the pointer 29, the electromagnet of the valve 50 is energized, thus closing this valve and terminating the flow of steam therethrough to the engine 10, and, when the pressure of the fluid delivered by the pump has dropped sufficiently to allow the pointer or hand 28 to move from engagement with the pointer or hand 29, the valve 50 is again opened so that the output pressure of the pump is maintained substantially constant.

While the invention has been described with particular reference to the control of a steam engine of the reciprocating type to thereby control the output pressure of a reciprocating fluid pump, it will be readily understood that the invention is not restricted to use with reciprocating engines and pumps since the conduit 45 and the connection 27a can be, respectively, connected with the exhaust of a steam engine of different type and with the output of a rotary pump without altering the operation of the apparatus. Moreover, the invention is applicable with fluid operated prime movers other than steam engines, as for example, compressed air engines and gasoline or diesel type internal combustion engines. Consequently, the term "fluid-operated" in the subjoined claims is to be construed as covering these, as well as other similar type engines, the speed of which may be controlled by a valve means interposed in the conduit which supplies the operating fluid to the engine. Likewise, the term "valve means" in the claims, when used to refer to control of the operating fluid to the engine is to be considered as not only referring to the valve 19, but also to a construction such as shown in Fig. 2, wherein two separate valves, such as 49 and 50, are employed.

The invention herein disclosed may also be employed in installations where the prime mover is an electric motor by employing an electrical switch means in the power supply for the motor, which means is operated in response to the output pressure of the pump and a means responsive to a condition indicative of the speed of the motor. By way of example, the latter device may be a centrifugal governor connected with the shaft of the motor. Consequently, the term "prime mover" in the claims is not to be considered as restricted solely to fluid-operated engines.

Other and further modifications and adaptations of the invention will readily occur to those skilled in the art after having had the advantage of this disclosure and it is, therefore, to be understood that the apparatus herein specifically disclosed is illustrative only and the invention is not restricted to the specific details shown and described.

Having thus described the invention, I claim:

1. An apparatus for governing the operation of a fluid pump which is driven by an engine operated by fluid delivered thereto through a conduit, the said apparatus comprising a fluid pressure responsive device in communication with the output of said pump, a fluid pressure responsive device in communication with the exhaust of said engine, valve means in said fluid supply conduit for said engine, and means operatively interconnecting the said valve means with the fluid pressure responsive devices for operation of the former by the latter so that the supply of fluid to said engine is regulated by both the exhaust pressure of said engine and the pressure of the fluid delivered by said pump, whereby the said engine is prevented from racing while the pressure delivered by said pump is being raised to a predetermined value and the last-mentioned pressure is thereafter maintained substantially constant.

2. An apparatus as defined in claim 1 wherein the fluid pressure responsive device in communication with the output pressure of said pump includes manually settable means positionable to condition the said device for controlling operation of said valve means at different preselected values of the pump output pressure, whereby the pressure of the fluid delivered by said pump is maintained substantially constant at any preselected value.

3. An apparatus as defined in claim 1 and further comprising a by-pass for fluid around said valve means and means in said by-pass to regulate the flow of fluid therethrough whereby the quantity of fluid delivered to said engine cannot drop below a predetermined value regardless of the operation of said valve means.

4. An apparatus as defined in claim 1 and further comprising manually operable valve means in said fluid supply conduit to control the flow of fluid therethrough, a by-pass for fluid around both of said valve means, and means in said by-pass to regulate the flow of fluid therethrough.

5. An apparatus for governing the operation of a fluid pump which is driven by an engine operated by fluid delivered thereto through a conduit, the said apparatus comprising a first valve in said conduit, means responsive to the pressure of fluid delivered by said pump for actuating said valve, a second valve in said conduit, and means responsive to the pressure of the exhaust of said engine for operating said second valve, whereby the supply of fluid to said engine is controlled by both the exhaust pressure of said engine and the pressure of the fluid delivered by said pump so that the said engine is prevented from racing while the pressure delivered by said pump is being raised to a predetermined value and the last-mentioned pressure is thereafter maintained substantially constant.

6. An apparatus as defined in claim 5 wherein the means responsive to the pressure of fluid delivered by said pump includes manually settable means positionable to condition the said responsive means for controlling operation of the first-mentioned valve at different preselected values of the pump output pressure, whereby the pressure of the fluid delivered by said pump is maintained substantially constant at any preselected value.

7. An apparatus for governing the operation of a fluid pump which is driven by an engine operated by fluid delivered thereto through a conduit, the said apparatus comprising a fluid pressure responsive device in communication with the output of said pump, a fluid pressure responsive device in communication with the exhaust of said engine, a single valve means in said fluid supply conduit for said engine, and means jointly controlled by said pressure responsive devices for operating the said valve means whereby the said engine is prevented from racing while the pressure of the fluid delivered by said pump is being raised to a predetermined value and the last-mentioned pressure is thereafter maintained substantially constant.

8. An apparatus as defined in claim 7 wherein the fluid pressure responsive device which is responsive to the output pressure of said pump includes a manually settable means positionable to condition the said device for operation of said valve means at different preselected values of the pump output pressure whereby the pressure of the fluid delivered by said pump is maintained substantially constant at any preselected value.

9. An apparatus as defined in claim 7 wherein the last-mentioned means includes a fluid pressure actuated means for operating the said valve means and the said pressure responsive devices each control the application of fluid pressure to said fluid pressure actuated means.

10. An apparatus as defined in claim 7 wherein the fluid pressure responsive device which is responsive to the output pressure of said pump includes a member movable in response to the pressure of the pump output, a manually settable member adapted to be engaged by said movable member, an electromagnetic means operatively connected to govern actuation of said valve operating means, and an electrical circuit interconnecting said members and said electromagnetic means whereby engagement of the former operates the latter to control operation of said valve means.

11. An apparatus as defined in claim 7 and further comprising a by-pass for fluid around said valve means and means in said by-pass to regulate the flow of fluid therethrough whereby the quantity of fluid delivered to said engine cannot drop below a predetermined value regardless of the operation of said valve means.

12. An apparatus for governing the operation of a fluid pump which is driven by an engine operated by fluid under pressure delivered thereto through a conduit, the said apparatus comprising valve means in said conduit adapted to control the flow of fluid under pressure to said engine, fluid pressure actuated means for operating said valve means, a pair of valves, means to conduct fluid under pressure from said conduit in series through said pair of valves and to said fluid pressure actuated means, means responsive to the pressure of the pump output for operating one of said pair of valves, and means responsive to the exhaust pressure of said engine for operating the other of said pair of valves, whereby the said engine is prevented from racing while the pressure delivered by said pump is being raised to a predetermined value and the last-mentioned pressure is thereafter maintained substantially constant.

13. An apparatus as defined in claim 12 wherein the means for operating said one of the pair of valves includes electromagnetic means, a member movable in response to the pressure of said pump output, a manually settable member adapted to be engaged by said movable member, and an electrical circuit interconnecting said members and said electromagnetic means whereby the value of said pump output pressure which is maintained substantially constant is adjustable by positioning of said settable member.

14. An apparatus as defined in claim 12 wherein the said means for operating said other of the pair of valves includes a fluid pressure actuated means and means for communicating the exhaust pressure of said engine to the last-mentioned fluid pressure actuated means.

15. An apparatus as defined in claim 12 and further comprising manually operable valve means in said conduit to control the flow of fluid therethrough, a by-pass for fluid around both of said valve means, and means in said by-pass to regulate the flow of fluid therethrough.

16. An apparatus of the character described comprising, a fluid pump, an engine operated by fluid and connected with said pump to drive the latter, a conduit for supplying operating fluid to said engine, a fluid pressure responsive device in communication with the output of said pump, a fluid pressure responsive device in communication with the exhaust of said engine, valve means in the said conduit, and means operatively interconnecting the said valve means with the fluid pressure responsive devices for operation of the former by the latter so that the supply of fluid to said engine is regulated by both the exhaust pressure of said engine and the pressure of the fluid delivered by said pump whereby the said engine is prevented from racing while the pressure of the fluid delivered by said pump is being raised to a predetermined value and the last-mentioned pressure is thereafter maintained substantially constant.

17. An apparatus as defined in claim 16 wherein the fluid pressure responsive device in communication with the output pressure of said pump includes manually settable means positionable to condition the said device for controlling operation of said valve means at different preselected values of the pump output pressure, whereby the pressure of the fluid delivered by said pump is maintained substantially constant at any preselected value.

18. An apparatus as defined in claim 16 and in which said valve means comprises a pair of separate valves in said conduit each individually operatively connected for actuation by one of said fluid pressure responsive devices.

19. An apparatus of the character described comprising, a fluid pump, an engine operated by fluid under pressure and connected to said pump to drive the latter, a conduit for supplying operating fluid to said engine, valve means in said conduit adapted to control the flow of fluid under pressure to said engine, fluid pressure actuated means for operating said valve means, a pair of valves, means to conduct fluid under pressure from said conduit in series through said pair of valves and to said fluid pressure actuated means, means responsive to the pressure of the pump output for operating one of said pair of valves, and means responsive to the exhaust pressure of said engine for operating the other of said pair of valves, whereby the said engine is prevented from racing while the pressure delivered by said pump is being raised to a predetermined value and the last-mentioned pressure is thereafter maintained substantially constant.

RALPH A. SPENGLER.

REFERENCES CITED

The following references are of record in the file of this patent:

UNITED STATES PATENTS

| Number | Name | Date |
| --- | --- | --- |
| 1,211,007 | Teague | Jan. 2, 1917 |
| 1,536,697 | Wechsberg | May 5, 1925 |
| 1,708,814 | Warner et al. | Apr. 9, 1929 |
| 1,714,925 | Sandberg | May 28, 1929 |
| 1,728,841 | Stein | Sept. 17, 1929 |